Oct. 7, 1958 J. L. KLECKLEY 2,854,775
FISHING ROD CASE
Filed June 21, 1954
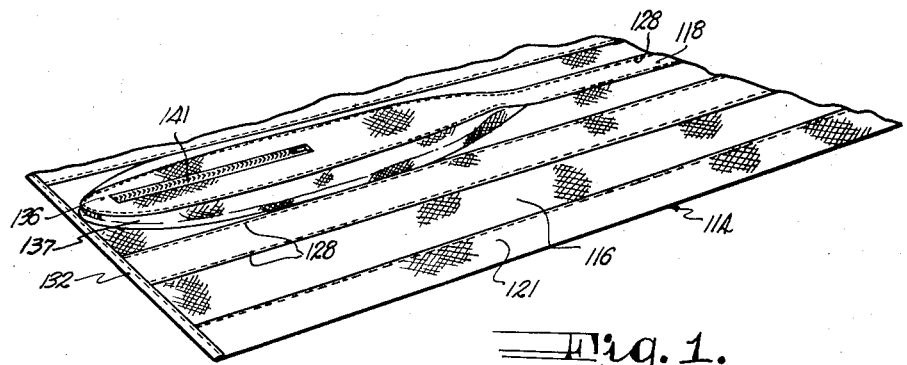
Fig. 1.
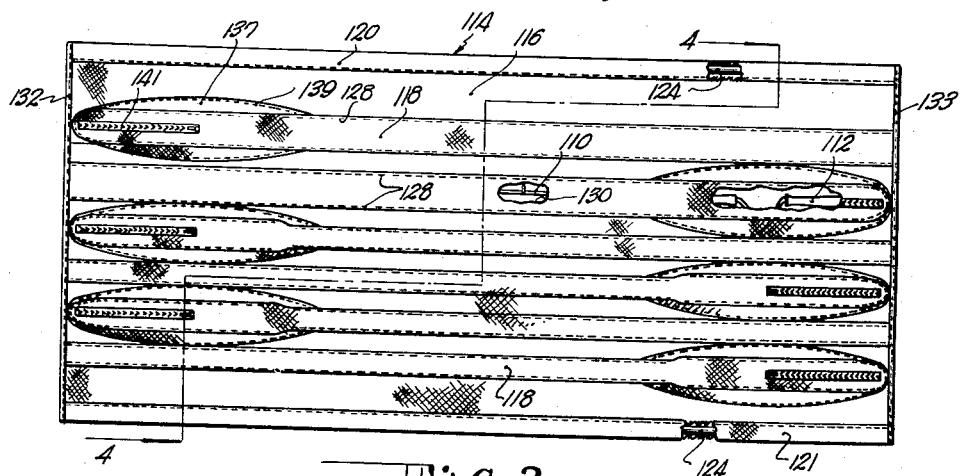
Fig. 2.
Fig. 3.
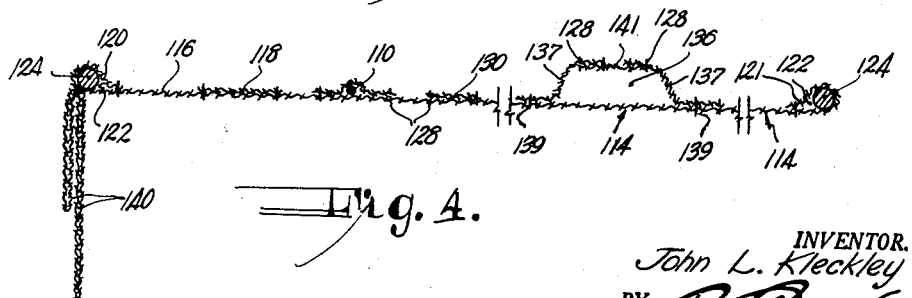
Fig. 4.
INVENTOR.
John L. Kleckley
BY
ATTORNEY.

United States Patent Office 2,854,775
Patented Oct. 7, 1958

2,854,775

FISHING ROD CASE

John L. Kleckley, Gainesville, Ga.

Application June 21, 1954, Serial No. 438,283

1 Claim. (Cl. 43—26)

The present invention has for its primary object the provision of a carrying case for fishing tackle and more specifically of a multi-pocket flexible receiver for fishing rods and handles.

While many types of tackle boxes have heretofore been provided for the convenience of the fisherman, and although rods and reels have heretofore been provided with covers, this inventor has not discovered a satisfactory case for receiving a large number of rods and poles, together with their handles and reels so as to facilitate carrying the same and keeping such tackle assembled when not in use.

It is the most important object of the instant invention, therefore, to provide a carrying case having a body made entirely of flexible material such as nylon or other synthetic substance, or a relatively heavy, preshrunk, waterproof or water repellant drill or the like, and including relatively superimposed panels interconnected by lines of stitching to present a series of side-by-side rod-receiving pockets.

Another object of this invention is to provide a carrying case that includes a number of pouches at the ends of the rod-receiving pockets for receiving the handles and reels of the fishing rods.

Another object includes the provision of a number of tapes on the primary panel for tying the bundle; of means of closing one end of the rod-receiving pockets, as well as the stay-receiving pockets with transverse hems on the primary panel; and many additional, more minor objects all of which will be made clear as the following specification progresses.

In the drawings:

Fig. 1 is a fragmentary perspective view of the inside of a fishing rod case made according to the instant invention.

Fig. 2 is a plan view showing the inner face of the case illustrated in Fig. 1.

Fig. 3 is an elevational view showing the case of Figs. 1 and 2 rolled and tied in a bundle; and Fig. 4 is an enlarged, cross-sectional view taken on irregular line 4—4 of Fig. 2, looking in the direction of the arrows.

As illustrated in Fig. 2 of the drawing, the fishing tackle carrying case forming the subject matter of the instant invention has been particularly and especially designed to accommodate relatively long objects such as fishing rods or poles 110, together with their handles 112, that are normally connected to the rods 110 by chuck means in a well-known manner.

In carrying out the principal object of the invention relating to the keeping of a number of rods 110 and their handles 112 assembled in a single case, there is provided a body 114 that is preferably composed entirely of flexible material as above set forth.

Body 114 includes an elongated, primary panel 116 provided with a plurality of long, narrow secondary panels 118 on the inner face thereof.

Panel 116 is provided with longitudinal hems 120 and 121 presenting pockets 122 for receiving rigid stiffening stays 124 held in place within the pockets 122 by transverse hems 132 and 133 at the ends of the panel 116.

The spaced-apart secondary panels 118 are secured to the primary panel 116 by parallel longitudinally extending lines of stitching 128, presenting a plurality of side-by-side elongated, longitudinal pockets 130 for receiving the rods 110. It is to be noted that the hems 132 and 133 also close the ends of the pockets 130.

Each pocket 130 is also provided with an enlarged pouch 136 at one end thereof which is formed by provision of an insert 137 which is elliptical in configuration as seen in Fig. 2, insert 137 being looped around one end of a corresponding secondary panel 118 and secured thereto by the lines of stitching 128. The inserts 137 are also secured directly to the primary panel 116 by an elliptical line of stitching 139. An access opening to each pocket 138 formed in the secondary panel 118 may be closed by means of slide fasteners 141. The enlarged pouches 136 are adapted to accommodate handles 112, together with their reels if desired. By virtue of the staggered or alternate arrangement of the pouches 136 at opposite ends of the panel 116, the body 114 may be rolled to the condition shown in Fig. 3 of the drawings and held by tying tapes 140. A handle 142 secured to the outer face of the panel 116 facilitates carrying of the bundle.

Details of construction may vary within the spirit of the invention and, therefore, it is desired to be limited only by the scope of the appended claim.

Having thus described the invention what is claimed as new and desired to be secured by Letters Patent is:

In a carrying case for a fishing rod having a handle, said case being adapted to be rolled and tied into an elongated bundle and including a rectangular panel of flexible material; a plurality of spaced longitudinal strips of flexible material on one face of the panel and coextensive in length therewith; an elliptical insert of flexible material on said face of the panel at one end of each strip respectively, said inserts alternating with the strips at both ends of the panel; means for attaching each strip to the panel thereby presenting a plurality of elongated, rod-receiving pockets; means for attaching each strip to the panel thereby presenting a plurality of handle-receiving pouches, each pouch communicating with a corresponding pocket, whereby the rods may be inserted into the pockets and their handles into the pouches without removal of the handles from the rods, the inserts being disposed between their respective proximal strips and the panel; means attaching the strips to their inserts, each strip having an access opening aligned with the corresponding pouch; and a slide fastener mounted on each strip respectively at said opening thereof for closing the latter.

References Cited in the file of this patent

UNITED STATES PATENTS

| | | |
|---|---|---|
| 679,422 | Heritage | July 30, 1901 |
| 1,513,514 | London | Oct. 28, 1924 |
| 1,565,389 | Peacock | Dec. 15, 1925 |
| 1,684,232 | Levit | Sept. 11, 1928 |
| 1,711,677 | Hansen | May 7, 1929 |
| 2,153,549 | Cooper | Apr. 11, 1939 |
| 2,575,118 | Pattison | Nov. 13, 1951 |
| 2,713,937 | Schneider | July 26, 1955 |